No. 871,106. PATENTED NOV. 19, 1907.
E. G. BURKHARDT.
HARNESS.
APPLICATION FILED FEB. 9, 1907.

Witnesses:
Jas. E. Hutchinson
G. Percy Campbell

Inventor:
Edward G. Burkhardt.
By Bacon & Milans, Attorneys.

UNITED STATES PATENT OFFICE.

EDWARD G. BURKHARDT, OF OAKLAND, CALIFORNIA, ASSIGNOR TO MAIN-WINCHESTER-STONE COMPANY, OF OAKLAND, CALIFORNIA, A CORPORATION OF NEVADA.

HARNESS.

No. 871,106.  Specification of Letters Patent.  Patented Nov. 19, 1907.

Application filed February 9, 1907. Serial No. 356,600.

*To all whom it may concern:*

Be it known that I, EDWARD G. BURKHARDT, a citizen of the United States, residing at Oakland, in the State of California, have invented certain new and useful Improvements in Harness, of which the following is a specification, reference being had therein to the accompanying drawing.

This invention relates to an improvement in harness, and more particularly to an improvement in breeching therefor.

The object of the invention is the provision of a breeching, which is of a simple construction, which can be readily employed with any well known form of harness, and which can be quickly and readily attached to or removed from the horse.

A further object of the invention is the provision of a breeching which will not interfere with the free movement of the hind quarters of the horse.

A further object of the invention is the provision of a breeching which, in backing, will relieve the saddle and girth from all pressure and cause the same to be distributed in a natural manner onto the hips and belly of the horse.

Other objects of the invention will be apparent from the detailed description hereinafter, when read in connection with the accompanying drawings forming a part hereof, wherein a preferable embodiment of my invention is shown, and wherein like numerals of reference refer to similar parts in the several views.

Figure 1:
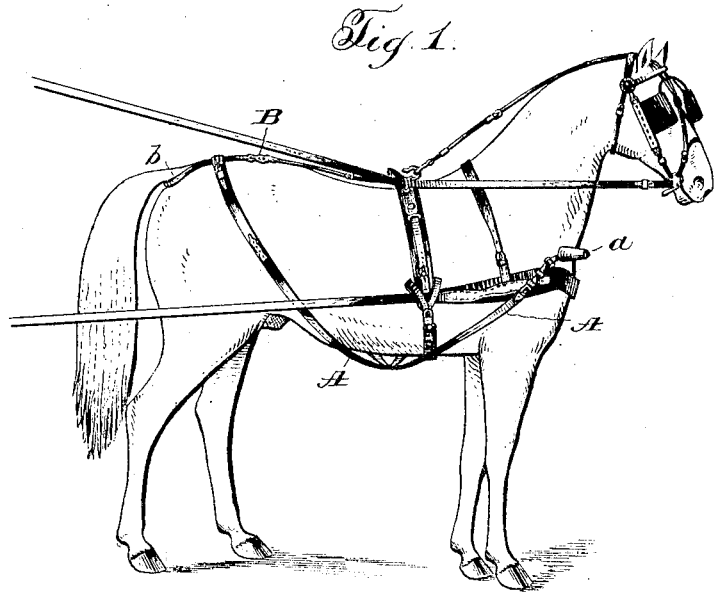
Figure 2:
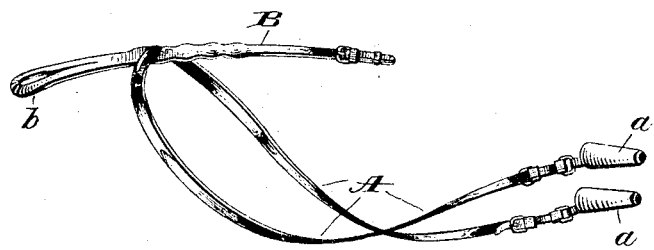

Figure 1 is a view of a horse equipped with my improved breeching, and Fig. 2 is a view of the breeching strap detached.

Referring now more particularly to the drawings, A designates my improved breeching, which is formed on a single strap which passes over the rump of the horse at or near the root of the tail and the ends of which pass down along the sides of the horse, crossing under the belly and terminate in thimbles *a*, which are designed when the breeching is secured in position to engage with the tips of the shafts of the vehicle to which the horse is harnessed.

The thimbles *a* are preferably adjustably connected to the ends of the breeching strap A by straps and buckles, so that the breeching may be adjusted to adapt the same to horses of different sizes. The portion of the breeching A overlying the hips of the horse is connected in any suitable manner to a back strap B, which is provided with the usual crupper *b*. From this construction it will be apparent that the breeching in no way interferes with the free movement of the hind quarters of the horse, and that in backing, no strain is brought on the saddle and girth, all of the pressure being distributed in a natural manner on the belly of the horse where the ends of the breeching crosses and on the hips at the root of the tail. It will also be obvious that by bringing the ends of the crossed breeching strap forward and securing the same to the tips of the shafts, not only will the shafts be prevented from rising when the horse is backed, and consequently bringing pressure on the girth, but a greater leverage is presented than where the breeching is connected to the shafts in rear of the tips thereof, and consequently the entire weight of the horse is available to hold back when going down grade.

Having thus described the invention, what is claimed is:—

1. In a harness, a breeching strap having a portion adapted to rest upon the hips of a horse and having its ends crossed to underlie the belly of the horse and terminating in means formed for engagement with the tips of the shafts.

2. In a harness, a breeching strap having a portion adapted to rest upon the hips of a horse and having its ends crossed to underlie the belly of the horse and terminating in thimbles adapted to fit over the tips of the shafts.

3. In a harness, a breeching strap having a portion adapted to rest upon the hips of a horse and having its ends crossed to underlie the belly of the horse and terminating in means formed for engagement with the tips of the shafts, and a crupper strap secured to the portion of the breeching strap adapted to overlie the hips of the horse.

In testimony whereof I affix my signature in presence of two witnesses.

EDWARD G. BURKHARDT.

Witnesses:
ROLAND L. BATHURST,
ROBT. C. KARLE.